C. F. MILLER.
ODOMETER.
APPLICATION FILED MAR. 14, 1918.
1,340,493.
Patented May 18, 1920.
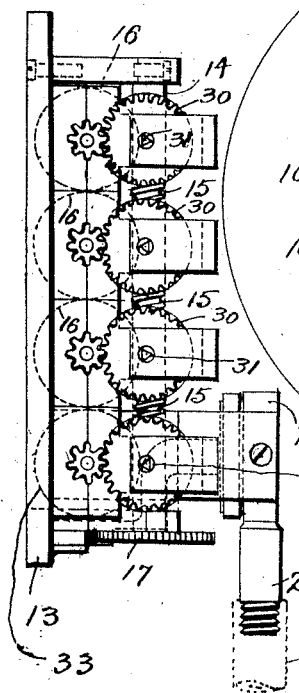
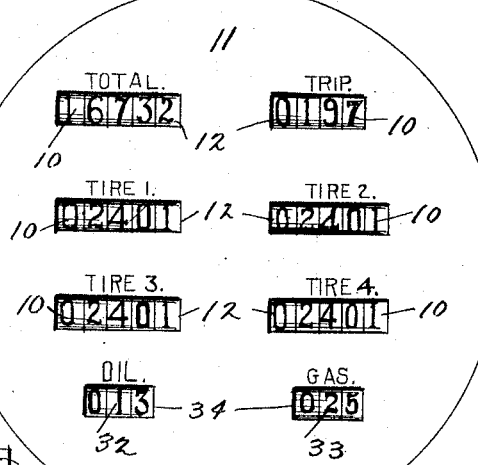
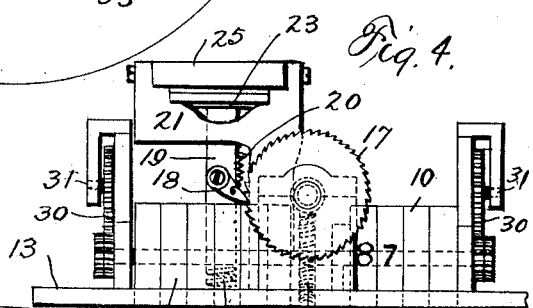
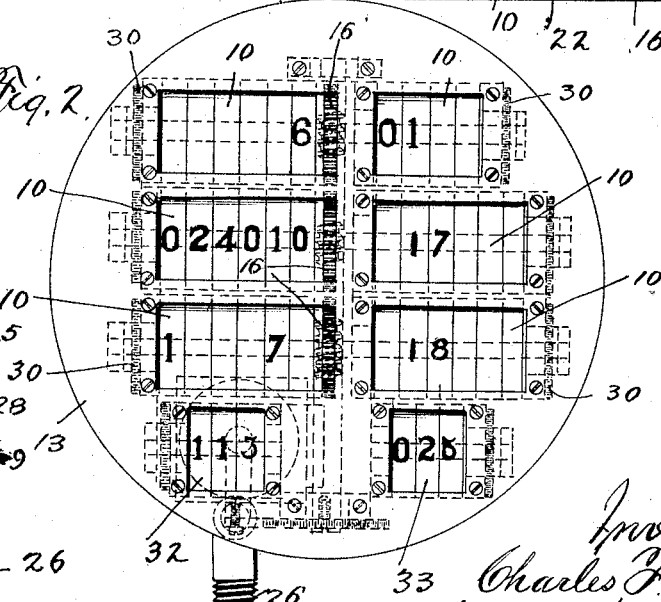
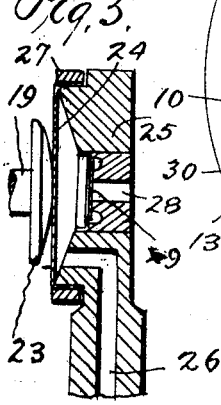

UNITED STATES PATENT OFFICE.

CHARLES F. MILLER, OF LANCASTER, PENNSYLVANIA, ASSIGNOR TO MARVIN SMITHEY, OF LAWRENCEVILLE, VIRGINIA.

ODOMETER.

1,340,493.   Specification of Letters Patent.   Patented May 18, 1920.

Application filed March 14, 1918. Serial No. 222,414.

*To all whom it may concern:*

Be it known that I, CHARLES F. MILLER, of Lancaster, in the county of Lancaster and in the State of Pennsylvania, have invented a certain new and useful Improvement in Odometers, and do hereby declare that the following is a full, clear, and exact description thereof.

My invention relates to registering mechanism, and more particularly to instruments for use with motor vehicles for registering not only total and trip mileage, but mileage of the individual tires and my object generally stated is to provide an instrument of this description that will be free from liability of getting out of order and which will be accurate even under the trying and difficult conditions of use on heavy auto trucks, and with such object in view my invention consists in a device constructed substantially as hereinafter specified and claimed.

In the accompanying drawings:

Figure 1 is a face view of an instrument embodying my invention;

Fig. 2 is a similar view with the face or dial plate removed;

Fig. 3 is a side elevation of the instrument;

Fig. 4 is a bottom view thereof.

Fig. 5 is a detail view in section of the pneumatic actuating device.

In the embodiment of my invention shown in the drawings there are six odometers or counters 10 shown, two of which respectively register the trip and the total mileage of the car or truck, and the other four respectively are associated with the four tires of the vehicle, each being adapted to show the mileage of one tire in particular and upon a face or dial 11 there are sight openings 12 for the display of the registrations of the various odometers, a suitable designation of the purpose or function of each odometer being marked on the dial adjacent the appropriate display opening. Said odometers 10 are mounted in two parallel groups upon a disk-form base plate or frame 13 so that they are arranged in pairs in axial alinement. The odometers shown are of old and well known type consisting of a series of side by side disks or rings with numerals on their peripheries, and as the internal construction thereof does not concern my invention, it is unnecessary to show and describe the same.

Situated between the two series of odometers is a worm shaft 14 having between each pair of axially alining odometers a worm 15 that meshes with a worm wheel 16 from which motion is imparted to both odometers of the alining pair. Thus not only the trip and total mileage odometers, but the four tire mileage registering odometers are all driven from the same centrally located worm shaft, and as the latter in the manner hereafter described is actuated from one of the wheels of the car or truck or from a shaft that revolves only when the driving wheels revolve, it will be seen that all of the odometers are driven simultaneously, which is possible because of the power of the worm gearing employed, and the mechanism is simple, compact, and efficient and able to withstand severe usage without being injured or impaired in its accuracy.

Upon one end of the worm shaft is secured a ratchet wheel 17, the teeth of which are adapted to be engaged in succession by a pawl 18 that is pivotally connected at one end to the side of a plunger 19 by whose reciprocation the pawl 18 is caused to intermittently or step by step rotate the ratchet wheel 17 and thereby actuate the odometers. The pawl 18 is yieldingly held in engagement with the ratchet wheel teeth by a coil spring 20 fastened at one end to the plunger and at the other end to the pawl. The plunger 19 is slidably mounted in a bracket or arm 21 which is secured to the base plate 12 and it is moved in one direction by a coil spring 22 interposed between the base plate 12 and the adjacent end of the plunger while its movement in the opposite direction, which is that for causing a turning movement of the ratchet wheel 17, is effected by the application of air pressure to a head 23 upon the other end of the plunger, the operating air pressure being produced by an air pump, not shown, which is operated preferably from the motor-driven shaft which revolves only when the driving wheels revolve and so timed that the odometers will be operated so as accurately to agree in their registrations with the mileage of a car or vehicle.

The plunger head 23 is held by the spring 22 in contact with the movable wall 24 of an air chamber 25 with which the air pump is connected, as for example, by a pipe P leading from the pump and connected to the end of a tubular extension or pipe 26 attached to the air chamber, the pipe 26 leading of course to the inside of the movable chamber wall 24 or on the side opposite to that engaged by the plunger head 23. The movable wall 24 of the air chamber is in the form of a diaphragm of flexible material which is stretched across the open side of the air chamber and secured in position by a ring 27 which binds the edge portion of the diaphragm against the outer wall of the air chamber 25. The pump employed may be simply a piston reciprocating in a closed cylinder so that by the reciprocation of the piston, the pressure in the air chamber 25 is alternately increased and diminished and thus a pulsating movement imparted to the movable wall or diaphragm 24. When the pump is not in action the diaphragm 24 is pressed inwardly into the chamber by the action of the spring 22 acting upon the plunger 19. Leading into the air chamber is a passage or port 28 at the inner end of which is a check valve 29 in the form of a thin disk of rubber which upon the passage of air under pressure from the pump through the pipe 26 into the chamber 25 closes the port 28 to the outflow of air and thus secures the desired pressure in the chamber 25 which forces the movable wall 24 outward and thereby moves the plunger 19 in the direction to cause the turning of the ratchet wheel 17 by the pawl 18. As will be seen a very simple and highly efficient substitute for the well known flexible shaft is provided for operating the odometers, and a device not only requiring little power for operating it, but able to successfully stand the rough usage which is destructive of the flexible shaft and which makes it impracticable for heavy trucks so that the present invention is especially fitted for use with heavy trucks. The pump of course can be actuated by being geared to one of the wheels of the vehicle.

Each of the odometers 10 is preferably provided with means for resetting to zero which includes a gear wheel 30 adapted to be meshed with the odometer and which has a shaft 31 with flattened sides adapted to be engaged by a key so that the odometers can be reset to zero only by one having the proper key.

It is desirable to keep track of the quantity of oil and gasolene consumed in the running of the car. For this purpose two counters 32 and 33 are secured to the base plate 12, below the two series of odometers 10, each having a sight opening 34 in the dial and being operated by hand to turn the register or indicating disks to indicate the quantity of oil or gasolene, as the case may be, supplied at a time to the car. For so operating each counter 32 and 33 each has an operating shaft 35 with a polygonal end for the application of a turning key.

Having thus described my invention what I claim is:

The combination of two series of odometers arranged in axially alining pairs, a worm wheel situated between each pair of axially alining odometers and driving both, a single shaft having a worm for each of said worm wheels, and means for revolving said worm shaft from a single source of power.

In testimony that I claim the foregoing I have hereunto set my hand.

CHARLES F. MILLER.